(12) United States Patent
Nittel

(10) Patent No.: US 6,682,790 B1
(45) Date of Patent: Jan. 27, 2004

(54) METHOD FOR MANUFACTURING FLEXIBLE CONTAINERS MADE OF THERMOPLASTIC PLASTICS

(76) Inventor: Cornelius Nittel, Eintrachstr. 13, 65193 Wiesbaden (DE)

( * ) Notice: Subject to any disclaimer, the term of this patent is extended or adjusted under 35 U.S.C. 154(b) by 0 days.

(21) Appl. No.: 09/480,436

(22) Filed: Jan. 10, 2000

Related U.S. Application Data

(63) Continuation-in-part of application No. 08/852,578, filed on May 7, 1997, now abandoned.

(30) Foreign Application Priority Data

May 7, 1996 (DE) .......................... 196 18 329

(51) Int. Cl.⁷ .......................... B29D 22/00; B29D 23/00; B32B 1/08
(52) U.S. Cl. ...................... 428/34.1; 428/35.7
(58) Field of Search .............. 428/34.1, 35.7; 222/183; 215/12.1, 12.2, 395, 398; 220/495.01, 495.06, 608

(56) References Cited

U.S. PATENT DOCUMENTS 3,765,574 A * 10/1973 Urquiza ...................... 222/183
5,361,906 A * 11/1994 Sterett .......................... 206/509

FOREIGN PATENT DOCUMENTS

| DE | 1 454 926 | 5/1969 |
| DE | 1 482 854 | 9/1969 |
| DE | 1 935 933 | 1/1970 |
| DE | 2 127 477 | 12/1972 |
| DE | 39 29 665 | 3/1991 |
| DE | 40 22 591 | 1/1992 |
| EP | 0 579 937 | 1/1994 |
| GB | 1 443 688 | 2/1975 |

\* cited by examiner

*Primary Examiner*—Kenneth R. Rice
(74) *Attorney, Agent, or Firm*—Frommer, Lawrence & Haug, LLP

(57) ABSTRACT

A flexible thermoplastic container liner, wherein the liner has at least one edge, wherein the liner is produced by a process having the steps of: molding the liner in a mold wherein the at least one edge is inverted; removing the liner from the mold; and reconfiguring the at least one edge to be noninverted. A process for producing a flexible thermoplastic container liner, wherein the liner has at least one edge, the process having the steps of: molding the liner in a mold wherein the at least one edge is inverted; removing the liner from the mold; and reconfiguring the at least one edge to be noninverted.

9 Claims, 1 Drawing Sheet

METHOD FOR MANUFACTURING FLEXIBLE CONTAINERS MADE OF THERMOPLASTIC PLASTICS

This application is a continuation in part of application Ser. No. 08/852,578 filed May 7, 1997 now abandoned.

BACKGROUND OF THE INVENTION

The invention relates to a method for manufacturing flexible container liners made of thermoplastic plastics by means of vacuum forming, swaging or blow molding, having edges running regularly. The container liners are for use with Intermediate Bulk Containers that may be rigid, semi-rigid, flexible intermediate bulk containers (FIBC), or collapsible.

Such methods have been known for a long time and when manufacturing small containers, as a rule no problems occur. This is also true for the manufacture of large containers of cubic shape when applying vacuum forming, swaging or blow molding methods as far as in doing so, rigid containers are produced having a large wall thickness. However, if the wall thickness is minimized in order to thereby form flexible foldable container liners, particularly at the corners thin portions occur. This frequently results in leakages which cannot be permitted.

For blow molding, it has to be attempted to blow up the molding from a preform or parison out of the ring nozzle of the extruder. In this case, the wall thickness only permits a minimization for favorable form relationships. Otherwise here too, weak portions result with the danger of leakage. There is a possibility for the traditional swaging to apply male molds. However, they can only be used for open trough-shaped dies.

In the so-called twinsheet method, as described for example in EP-0 579 737 A1, molding is realized in the two die molds substantially by using a vacuum. The closed die does not permit auxiliary molding devices such as male molds. Therefore, for larger molding the swaging depth is limited.

At the lowest portions, it can only be achieved with a general minimization of the wall thickness as compared to other portions of the wall of the container. The problem, that it is extremely difficult to obtain a uniform wall thickness over the total area of a cubic container, mainly concerns the corner regions.

Therefore, in DE-40 22 591 A1, it has been attempted to limit the weak portions at least in that the sheet material used is subjected, with its molecular orientation, to a particularly calculated curvature in the region of the corners. However, the apex also remains only in an approximately crowned corner mold and is limited to relatively large wall thicknesses for safety reasons already for smaller containers having a maximum content of up to 30 liters.

SUMMARY OF THE INVENTION

The invention is based upon the object to design the corner region to be sufficiently thick mainly for larger container liners, also for generally smaller wall thickness of the container liner, and to adjust it to the rest of the sheet appearance.

According to the invention, this is achieved in that the edges are molded into the internal of the container liner contrary to their final arrangement. When manufacturing cuboid-shaped containers, the corners of the cuboid are molded towards the inside. That means from the molding technology point of view, the corner regions are molded in the hollow of the container opposite to its arrangement according to the method of manufacturing. The corners can be formed in a pyramid shape, whereby the edges of the pyramid can comprise roundings, the radii of which can preferably be 10 mm and more. Generally, the edges can comprise curvatures. The pyramid shaped [indents] indentations or inverted corners are, as a rule, formed synmuetrically/diagonally into the cavity of the mold and are provided with suitable radii. The corners can also be formed in the shape of ball segments, the radii of which can be 10 mm and more. The suitable radius depends on the size of the container liner.

With the inventive method, the forming of the corners is displaced to the center of the mold. Thereby, a larger amount of swagble thicker sheet material at this point hits the molding displaced towards the inside. With a suitable selection of the transition zones in the wall of the mold, a very uniform distribution of sheet mass is possible. It has to be noted that all corners of the container liner are formed in the same way and that the radius of the curvature of the surfaces resulting with the comer region directed towards the inside substantially have the same radius of curvature.

After removal from the mold, the shape of the container is obtained by [excrescensing] reconfiguring the corners to a noninverted configuration. The entire container liner manufactured according to the invention including its corner regions comprises a substantially uniform wall thickness. Thereby it is achieved that for the Procedure of Permission for the transport of fluids according to UN standards on rails, roads and by sea, no problems occur.

The inventive method is suitable for the manufacture of container liners of any size. However, it is particularly suited for the manufacture of large container liners, particularly container liners with a content of more than 50 liters, preferably with a content of more than 100 liters. The container liners can be particularly used for the transport of fluids or powders in supporting casing, but also without it. The method is particularly suited for the manufacture of flexible plastic container liners which can be inserted into foldable and collapsible pallet containers and which store and transport liquid products. In a known way, paperboard constructions as well as supporting structures consisting of wood, metal or rigid plastics or the like are used as casing. A casing made of woven polypropylene material (FIBC) can also be used.

With the inventive method, the edges of cylindrical containers can also be molded correspondingly.

According to one aspect of the invention, there is provided a flexible thermoplastic container liner, wherein the liner has at least one edge, wherein the liner is produced by a process having the steps of: molding the liner in a mold wherein the at least one edge is inverted; removing the liner from the mold; and reconfiguring the at least one edge to be noninverted.

According to a further aspect of the invention, there is provided a process for producing a flexible thermoplastic container liner, wherein the liner has at least one edge, the process having the steps of: molding the liner in a mold wherein the at least one edge is inverted; removing the liner from the mold; and reconfiguring the at least one edge to be noninverted.

BRIEF DESCRIPTION OF THE DRAWINGS

Further details and advantages of the invention can be derived from the embodiment represented in the drawing. It shows.

DETAILED DESCRIPTION OF THE INVENTION

Figure 1:
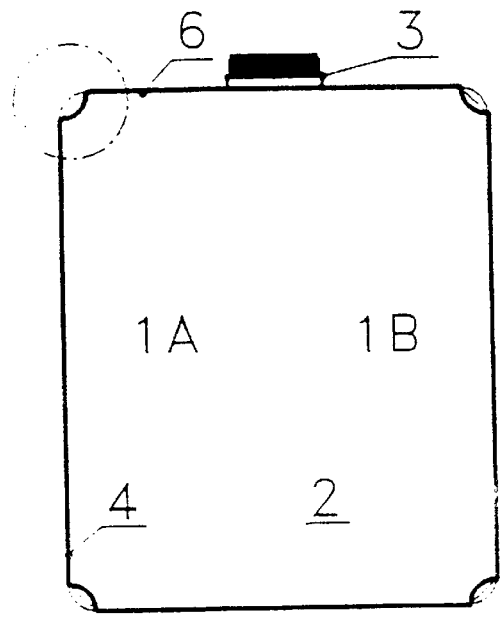
FIG. 1 a side view of an inventively manufactured container liner.
Figure 2:
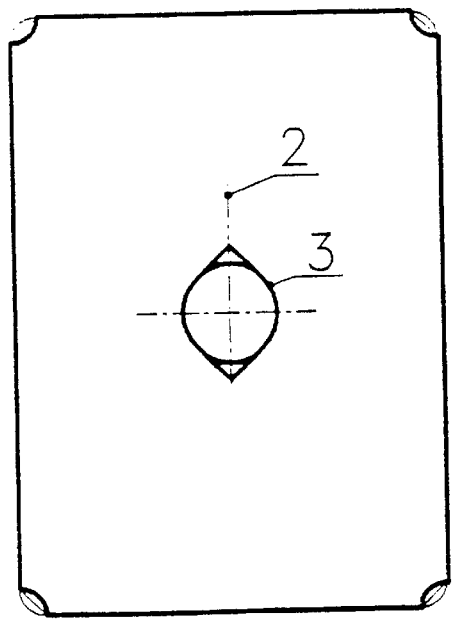
FIG. 2 a plan view of the container liner according to FIG. 1.

The container liner shown in FIGS. 1 and 2 is manufactured according to the so-called twinsheet method by vacuum forming two thermoplastic sheets by means of a vacuum pressure difference in a known manner. In this method, the position of the seam 2 of the two halves 1A and 1B of container 1 is thermoplastically welded during the forming process so as to eliminate dramatic thinning in the corners. At least one insert 3 is introduced in the top surface of the container, by means of which filling of the container liner 1 can be performed. The insert 3 can be formed as a fill-in socket having thread. Corresponding members can be inserted at the top side of the container liner as vent openings and in the bottom part as discharging sockets. The shown container liner used for testing purposes was cuboid-shaped and had a content of 750 liters. Its length was 1080 mm, its width 930 mm and its height 765 mm. The weight of the container liner was 4.5 kg, its minimum wall thickness was 0.4 mm. As material, low density polyethylene (LDPE) was used.

In the context of a twinsheet process, the inverted corners in the mold eliminate the need for a plug assist which is typically used to prevent thinning of a deep draw component.

Figure 3:
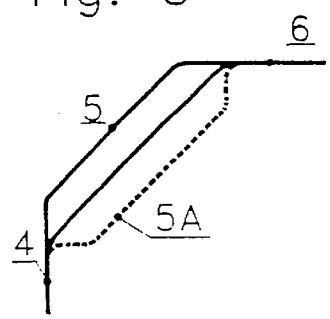
FIG. 3 an enlarged view of the corner marked with a circle in FIG. 1.

In the following, the inventive embodiment of the eight corners of such a container liner is described. The upper corner marked with a circle in FIG. 1 is represented in FIG. 3 with enlarged scale. It can be seen from this figure that the edge 4 of the container liner 1 is running perpendicularly upwards is flattened in the form of a flat surface 5 in the region of the corner, followed by the edge 6 of the top surface of the container liner. When manufacturing the container liner, this flattened edge 5 is drawn inwardly (inverted) in the shape designated by reference numeral 5A and is [brought] reconfigured into the final shape only after the thermoplastic connection of the two container halves 1A and 1B and the removal from the manufacturing mold.

Figure 4:
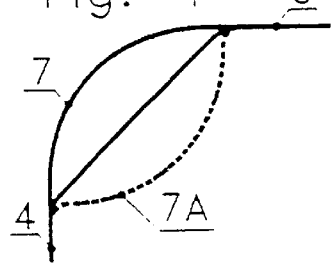
FIG. 4 an embodiment of the corner corresponding to FIG. 3 of another container liner.

FIG. 4 shows another embodiment for forming the corners of a container liner. This embodiment has the form of a ball segment which is, when manufactured, drawn inwardly (inverted) from the edge formed by the surfaces 4 and 6 according to the surface 7A and which is only [brought] reconfigured towards the outside afterwards into the final shape designated with reference numeral 7.

Figure 5:
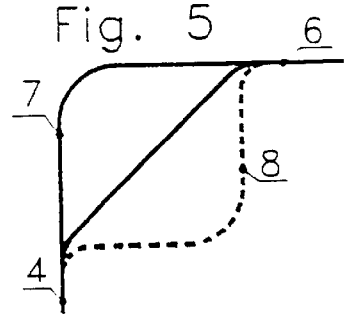
FIG. 5 a further embodiment of the corner as well as the associated insert in a swaging mold.

FIG. 5 shows an embodiment corresponding to FIG. 4 together with the mold member 8 inserted into the corners of the swaging mold when manufacturing the container liner.

What is claimed is:

1. A flexible thermoplastic container liner, wherein said liner has at least one edge, wherein said liner is produced by a process comprising:

molding said liner in a mold wherein the at least one edge is inverted;

removing said liner from the mold; and reconfiguring said at least one edge to be noninverted.

2. A liner as claimed in claim 1, wherein said molding comprises molding said liner in a cuboid shape and molding the at least one corner of the cuboid shape inverted.

3. A liner as claimed in claim 2, wherein said molding further comprises molding the at least one corner pyramidally.

4. A liner as claimed in claim 3, wherein said molding further comprises molding at least one edge of the pyramidal at least one corner in a rounded configuration.

5. A liner as claimed in claim 3, wherein said molding further comprises molding at least one edge of the pyramidal at least one corner in a flattened configuration.

6. A liner as claimed in claim 4, wherein said molding further comprises molding the rounded at least one edge of the pyramidal at least one corner with a radii of at least about 10 mm.

7. A liner as claimed in claim 1, wherein said molding comprises molding said liner to have a wall thickness which is approximately constant in a region of the at least one corner.

8. The liner as claimed in claim 2, wherein said molding further comprises molding at least one corner in a shape of a ball segment.

9. The liner as claimed in claim 8, wherein said ball segment has a radii of at least about 10 mm.

* * * * *